(12) United States Patent
Stephens

(10) Patent No.: US 6,700,080 B2
(45) Date of Patent: Mar. 2, 2004

(54) WEIGHING SCALE WITH ADJUSTABLE, FOLD AWAY DISPLAY

(75) Inventor: Brian Stephens, Dublin (IE)

(73) Assignee: Terraillon Holdings Limited, Dublin (IE)

( * ) Notice: Subject to any disclaimer, the term of this patent is extended or adjusted under 35 U.S.C. 154(b) by 109 days.

(21) Appl. No.: 09/864,996

(22) Filed: May 24, 2001

(65) Prior Publication Data

US 2002/0003050 A1 Jan. 10, 2002

(30) Foreign Application Priority Data

May 31, 2000 (GB) ............................................. 0013253
May 26, 2000 (GB) ............................................. 0012961

(51) Int. Cl.[7] ............................................. G01G 23/18
(52) U.S. Cl. ........................ 177/126; 177/238; 177/244
(58) Field of Search ................................ 177/126, 127, 177/177, 238, 239, 244

(56) References Cited

U.S. PATENT DOCUMENTS

| | | | |
|---|---|---|---|
| 4,364,442 A | * 12/1982 | Flickinger | ................... 177/177 |
| 4,840,239 A | 6/1989 | Slagg | ....................... 177/25.14 |
| 4,979,579 A | * 12/1990 | Dardat et al. | ................. 177/180 |
| 5,654,534 A | 8/1997 | Coleman | ..................... 235/472 |
| 5,675,493 A | * 10/1997 | Schwartz et al. | ......... 177/25.13 |
| 5,796,576 A | 8/1998 | Kim | .............................. 361/681 |
| 5,986,222 A | * 11/1999 | Helberg | ....................... 177/238 |
| 6,013,878 A | * 1/2000 | Schwartz et al. | ............ 177/238 |
| 6,043,438 A | * 3/2000 | Helberg | ....................... 177/126 |
| 6,441,323 B1 | * 8/2002 | Montagnino et al. | ........ 177/126 |
| 2002/0000337 A1 | * 1/2002 | Gietenbruch et al. | |
| 2002/0129978 A1 | * 9/2002 | Montagnino et al. | |

FOREIGN PATENT DOCUMENTS

| | | | | |
|---|---|---|---|---|
| DE | 31 40 483 A1 | * 4/1983 | ................... 177/126 |
| EP | 0910048 | 4/1999 | |
| GB | 2186375 | 8/1987 | |

* cited by examiner

*Primary Examiner*—Randy Gibson
(74) *Attorney, Agent, or Firm*—Olson & Hierl, Ltd.

(57) ABSTRACT

The invention comprises a weighing scale, comprising a weight-receiving platform and a display device, which is angularly adjustable with respect to the plane of the platform, whereby to provide an optimum viewing angle.

13 Claims, 3 Drawing Sheets

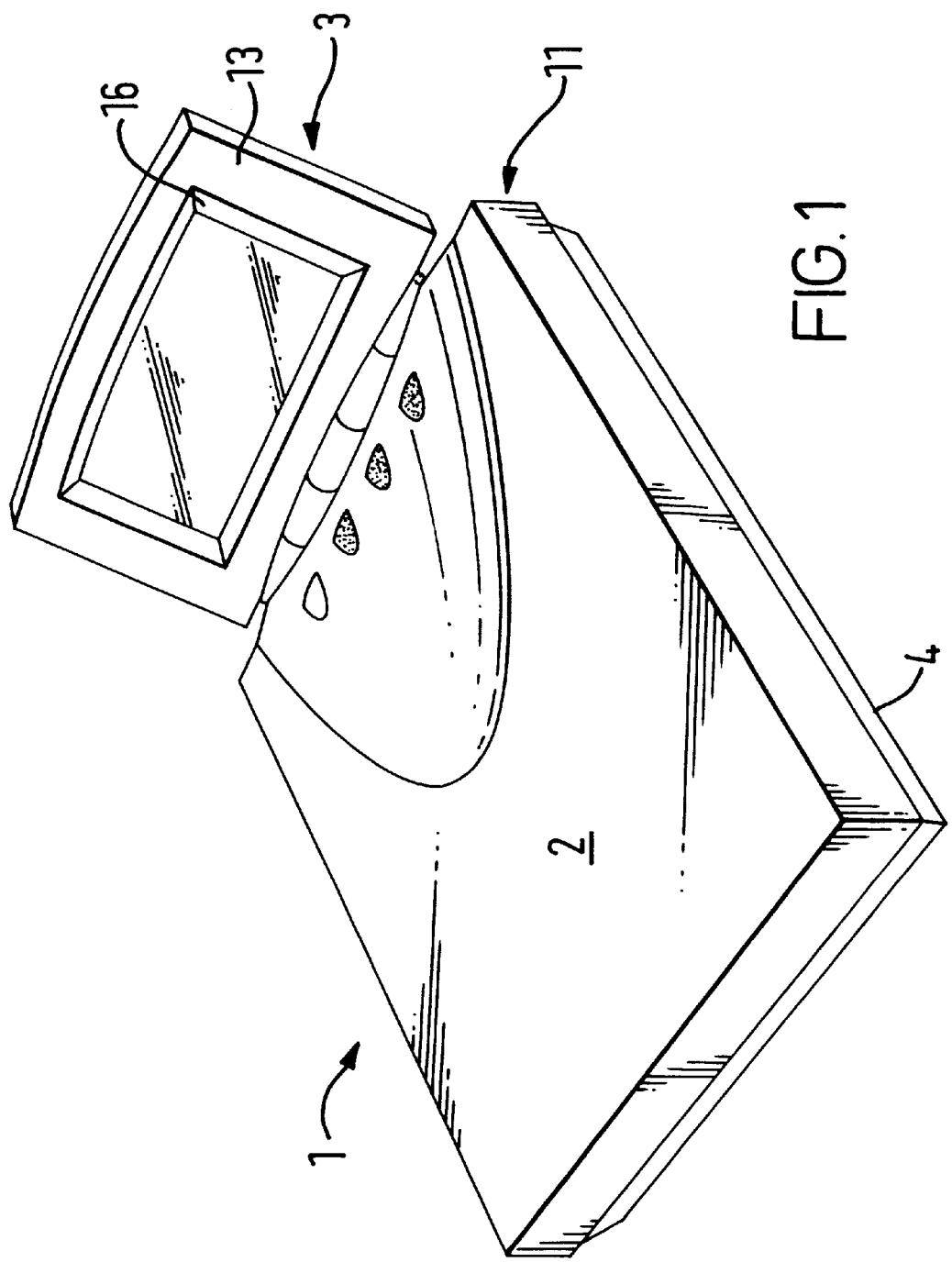

WEIGHING SCALE WITH ADJUSTABLE, FOLD AWAY DISPLAY

BACKGROUND OF THE INVENTION

The invention relates to a weighing scale, particularly a personal weighing scale.

Such scales usually have a display device, which can be mechanical or electronic, which displays the weight of a person standing on a platform of the scale in order to weigh themselves.

It is often the case that it is not easy to read the display, particularly because of functional limitations arising from the fact that the platform has to accommodate the feet of a user, and a scale or readout which displays the weight of the user. The display, scale or readout then necessarily has to be of small area impairing reading thereof. Also the person using the scale has to look directly down onto the scale to view the display, between their toes, again hindering easy reading. The display can also be relatively readily damaged, or become dirty, making it difficult to read.

It is an object of this invention to seek to mitigate these disadvantages.

According to the invention there is provided a weighing scale, comprising a weight-receiving platform and a display device which is angularly adjustable with respect to the plane of the platform, whereby to provide an optimum viewing angle.

The display device may be mounted on a part of the scale by a hinge means whereby it is angularly adjustable. This allows a user to select an optimum or ideal viewing angle for his or her personal comfort.

The hinge means may be attached to a body of the scale. This provides a relatively simple yet effective construction.

The body may comprise a recess in which a part of the hinge means or hinge device is secured. This provides for a smooth surface of the scale.

The part may be a plastic molding. This provides a relatively simple and inexpensive construction.

The part may include a pair of spaced hinge lugs for receiving a hinge lug of the display device. This provides a relatively simple hinge construction.

The hinge lug of the display device may be formed by two spaced superposed moldings between which is received a bezel, LED or LCD of the display device. This also provides a relatively simple yet effective construction of display device.

The hinge means may be operable between a position in which the display device can lie substantially parallel to and over the platform, and a desired viewing position. This provides for the display device to be folded against the platform for storage, packing and transport, so as to protect the display device and also to help in keeping it clean when not in use.

The hinge means may allow the display device to be set at any desired angular position. Thus when a user adjusts the display device to a personally comfortable angle the device will stay in that position until readjusted.

The scale may comprise a personal weighing scale or a kitchen scale.

BRIEF DESCRIPTION OF THE DRAWING

A personal weighing scale embodying the invention is hereinafter described, by way of example, with reference to the accompanying drawings:

FIG. 1 is a perspective view of a personal weighing scale according to the invention in a first position;

DETAILED DESCRIPTION OF THE PRESENT INVENTION

Figure 4:
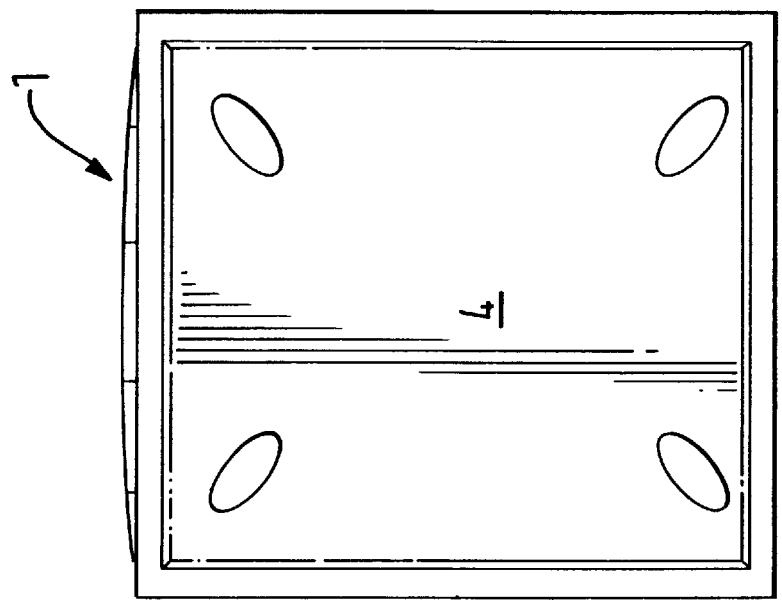
FIG. 4 is a bottom plan view of the scale of FIG. 2.

Referring to the drawings, there is shown a weighing scale 1 (in the embodiment a personal weighing scale) which has a weight receiving platform 2 and a display device 3 which is angularly adjustable with respect to the plane or surface of the platform 2, whereby to provide an optimum viewing angle. The scale 1 is electronic.

The platform 2 on which a user stands to be weighed is mounted over a body 4, which houses a suitable weighing mechanism such as levers (not shown) or an electronic weighing system, such as a piezo-electric system (not shown).

In the embodiment, the body 4 has a recess 5 (FIG. 5) in which a hinge part 6 is secured as by snap-engagement, there being nibs or projections 7 on the body 4 which snap-engage with nibs or projections 8 of the hinge part 6. The recess 5 and part 6 are curved and of 'D'-shape as shown and of substantially the same vertical (as considered in use) dimension so as to provide a smooth upper surface to the body of the scale.

There are two spaced hinge lugs 9 of the part 6 which are of sufficient spacing to receive a hinge lug 10 of the display device. The hinge lugs 9, 10 form the hinge means when assembled, a suitable element such as a rod being passed through the lugs 9, 10 and lying substantially parallel to the end 11 of the body to provide for hinging. The display device 3 is an LCD with a relatively large viewing surface area which has a LCD 12 sandwiched between two mouldings 13, 14 each of which holds half the hinge lug 10, and which mouldings are secured together by suitable means such as spigot and socket connections 25', 15".

There is also a bezel or lens in front of the LCD 12.

Figure 3:
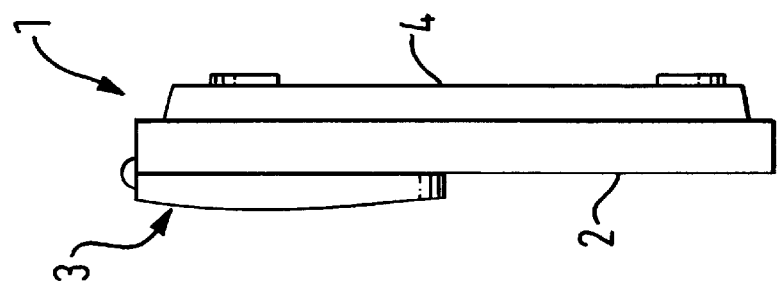
FIG. 3 is a side elevational view of the scale of FIG. 2.
Figure 2:
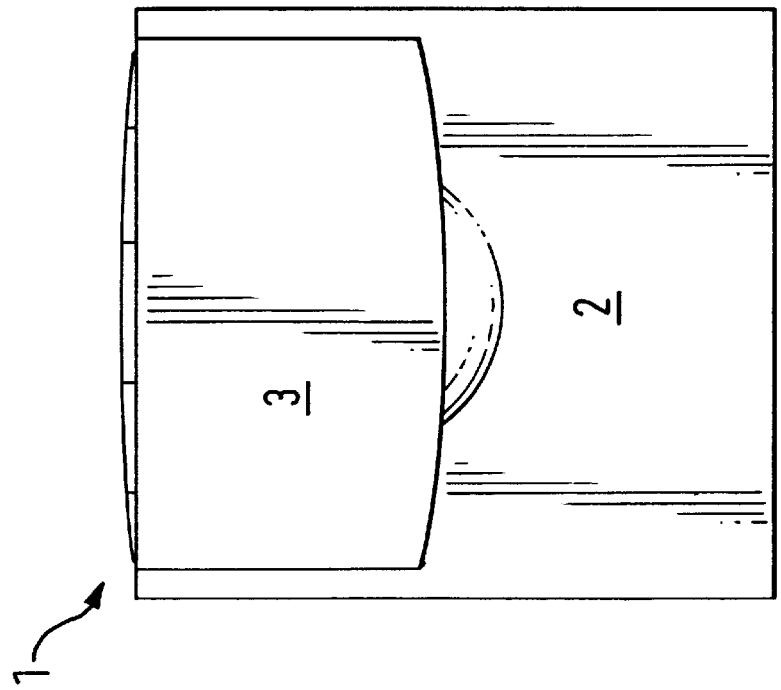
FIG. 2 is a top plan view of the scale of FIG. 1 in a second operative position.

In use, the display device is hinged between the positions shown in FIGS. 2 and 3, in which it overlies the platform 2 with the bezel or lens and LCD 12 facing the platform 2, and a set angular position, FIG. 1.

Thus the display device 3 in FIGS. 2 and 3 is stowed within the surface area of the scale and is protected for storage, transport and packing, and the lens 16 and LCD 12 can be kept clean when installed at a user location. The display device 3 is hinged up to any desired angular position, as shown in FIG. 1, to provide a desired optimum or ideal viewing angle for a particular user, the display device 3 being set or fixed at the selected angular position by the hinge means which has a friction engagement between the lugs 9, 10 so that once hinged and released, it stays in the selected position.

Figure 5:
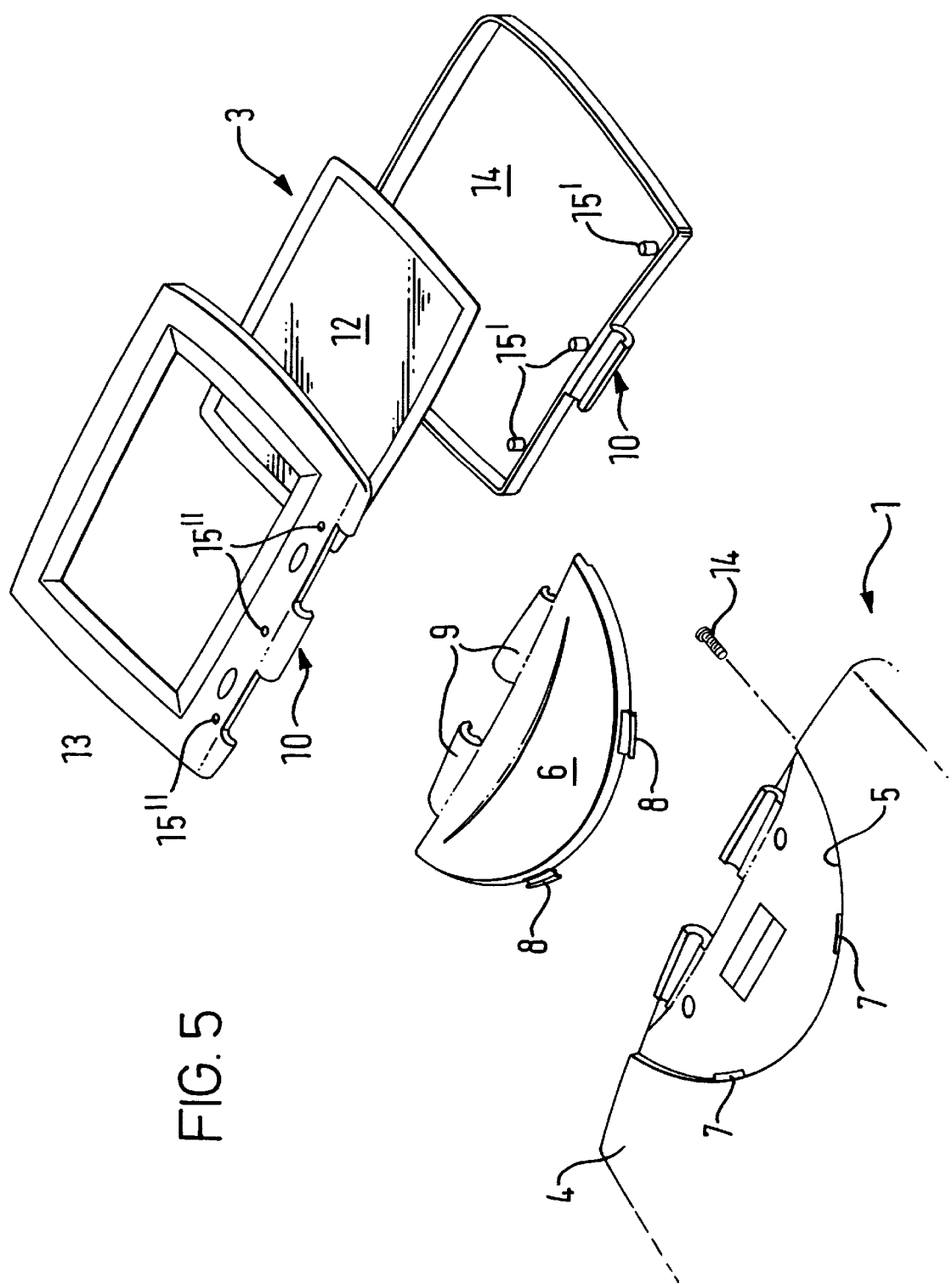
FIG. 5 is an exploded view of part of the scale of FIGS. 1 to 4.

The body and display device may be molded from plastic, and the part 6 may be secured in the recess by screws 17, one of which is shown in FIG. 5.

The weighing scale 1 may be provided in different sizes for different uses, for example, a smaller version of the weighing scale 1 may be used as an electronic kitchen scale.

While I have shown and described a presently preferred embodiment of the present invention, it be apparent to persons skilled in the art that the invention may be otherwise embodied within the scope of the following claims.

I claim:

1. A weighing scale, comprising a weight-receiving platform and a display device, which is supported on the weight-receiving platform, and which is angularly adjustable with respect to the plane of the platform, whereby to provide an optimum viewing angle, the display device being mounted on a part of the scale by hinge means, the hinge means being operable between a position in which the display device can lie substantially parallel to and over the platform, and a desired viewing position.

2. A scale according to claim 1, the hinge means being attached to a body of the scale.

3. A scale according to claim 2, the body comprising a recess in which a part of the hinge means is secured.

4. A scale according to claim 3, the part being snap-engaged in the recess of the body.

5. A scale according to claim 4, the part being a plastic molding.

6. A scale according to claim 5, the part including a part of spaced hinge lugs for receiving a hinge lug of the display device.

7. A scale according to claim 6, the hinge lug of the display device being formed by two spaced superposed molding between which is received a lens molding or display of the display device.

8. A scale according to claim 1, the hinge means allowing the display device to be set in any desired angular position.

9. A scale according to claim 1 comprising a personal weighing scale.

10. A scale according to claim 9, the display device comprising an LCD having a relatively large screen.

11. A scale according to claim 1, comprising an electronic kitchen scale.

12. A weighing scale, comprising a weight-receiving platform and a display device, which is supported on the weight-receiving platform, and which is angularly adjustable with respect to the plane of the platform, whereby to provide an optimum viewing angle, the display device being snap-engaged on a part of the scale by hinge means, the hinge means being operable between a position in which the display device can lie substantially parallel to and over the platform, and a desired viewing position.

13. A weighing scale, comprising a weight-receiving platform and display device, which is supported on the weight-receiving platform for angular adjustment with respect to the plane of the weight-receiving platform, the display device being mounted on a part of the scale by hinge means, said hinge means including friction engagement means for maintaining the display device in a selected angular position with respect to the weight-receiving platform, and being operable between a position in which the display can lie substantially parallel to and over the platform, and a desired viewing position.

* * * * *